United States Patent
Maeda

(10) Patent No.: US 11,521,330 B2
(45) Date of Patent: Dec. 6, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Ryo Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 17/099,491

(22) Filed: Nov. 16, 2020

(65) Prior Publication Data

US 2021/0158555 A1    May 27, 2021

(30) Foreign Application Priority Data

Nov. 27, 2019    (JP) .............................. JP2019-214784

(51) Int. Cl.
*G06T 7/55* (2017.01)
*G06T 7/73* (2017.01)
(Continued)

(52) U.S. Cl.
CPC .............. *G06T 7/55* (2017.01); *G06K 9/6256* (2013.01); *G06T 7/60* (2013.01); *G06T 7/73* (2017.01); *G06T 2207/30232* (2013.01); *G06T 2207/30242* (2013.01)

(58) Field of Classification Search
CPC .... G06T 7/55; G06T 7/60; G06T 7/73; G06T 2207/30232; G06T 2207/30242;
(Continued)

(56) References Cited

U.S. PATENT DOCUMENTS

2018/0005089 A1*   1/2018   Pham .................... G06K 9/6254
2018/0082129 A1*   3/2018   Yamaji ...................... G06T 7/60
(Continued)

FOREIGN PATENT DOCUMENTS

JP    2019-161610    *    9/2019

OTHER PUBLICATIONS

Basalamah et al. "Scale Driven Convolutional Neural Network Model for People Counting and Localization in Crowd Scenes", Digital Object Identifier 10.1109/ACCESS.2019. (Year: 2019).*

(Continued)

*Primary Examiner* — Qian Yang
(74) *Attorney, Agent, or Firm* — Canon U.S.A., Inc. IP Division

(57) ABSTRACT

An image processing apparatus includes a detection unit that executes detection processing for detecting a particular object in an image, a holding unit that holds object information indicating a position and a size of the particular object on the image, a determination unit that determines whether a number of times a particular object is detected in the detection processing on one or more images reaches a predetermined value, a first setting unit that, when the number of times a particular object is detected in the detection processing on the one or more images is determined to reach the value, sets estimation areas on an image based on the object information obtained by the detection processing on the one or more images, and an estimation unit that executes estimation processing for estimating a number of the particular objects in the estimation areas.

17 Claims, 9 Drawing Sheets

(51) Int. Cl.
*G06T 7/60* (2017.01)
*G06K 9/62* (2022.01)

(58) Field of Classification Search
CPC . G06T 2207/10016; G06T 2207/20021; G06T 2207/20081; G06T 2207/30196; G06T 7/74; G06T 7/77; G06K 9/6256; G06V 10/50; G06V 20/52
See application file for complete search history.

(56) References Cited

U.S. PATENT DOCUMENTS

| | | | |
|---|---|---|---|
| 2021/0065351 A1* | 3/2021 | Yamaji | G06F 17/18 |
| 2021/0090206 A1* | 3/2021 | Honjo | H04N 5/23225 |
| 2022/0076117 A1* | 3/2022 | Amon | G06T 7/70 |

OTHER PUBLICATIONS

Xing et al. "Robust Crowd Counting Using Detection Flow", 2011 18th IEEE International Conference on Image Processing (Year: 2011).*

Hiroo Ikeda, et al., Accuracy Improvement of People Counting Based on Crowd-Patch Learning Using Convolutional Neural Network, FIT2014 (Forum on Information Technology 2014), vol. 3, H-019.

Hiroo Ikeda, et al., Accuracy Improvement of People Counting Based on Crowd-Patch Learning Using Convolutional Neural Network, The Institute of Electronics, Information and Communication Engineers and Information Processing Society of Japan, 2014, 2 pages.

* cited by examiner

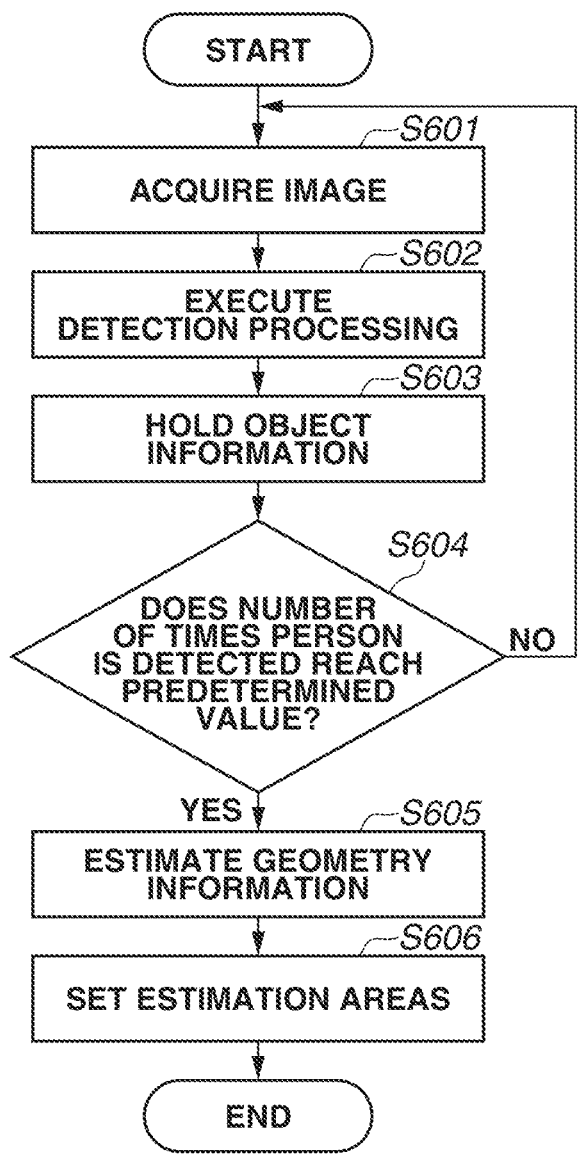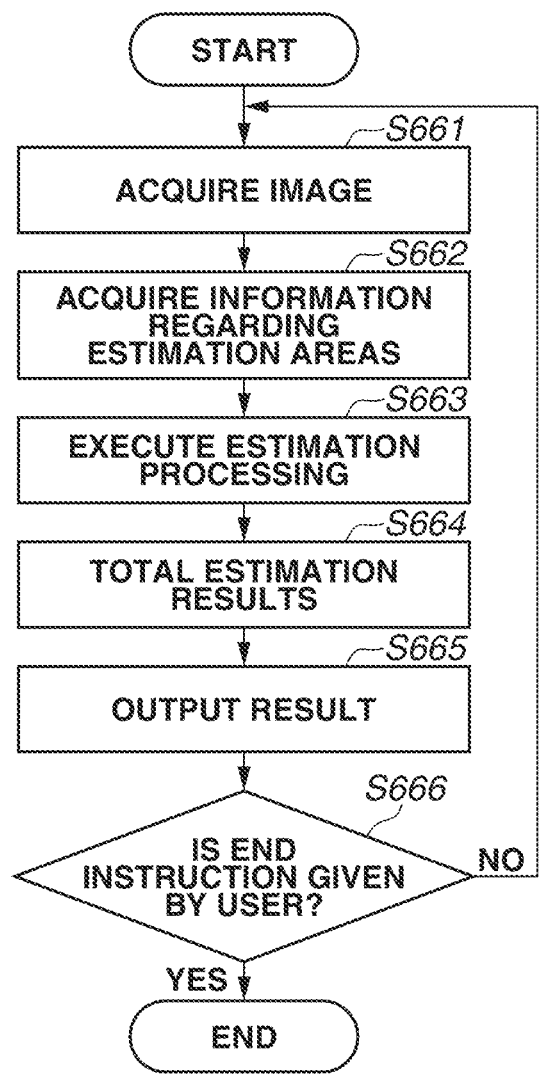

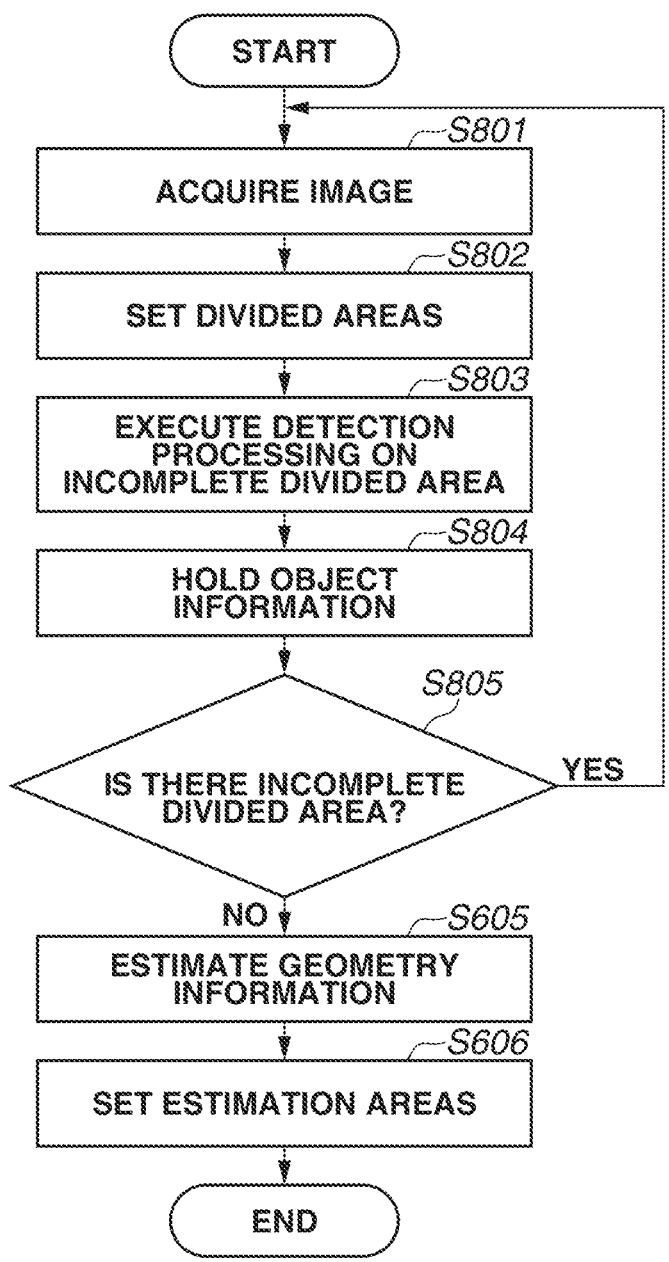

IMAGE PROCESSING APPARATUS, IMAGE PROCESSING METHOD, AND STORAGE MEDIUM

BACKGROUND OF THE INVENTION

Field of the Invention

The present disclosure relates to an image processing technique.

Description of the Related Art

In recent years, a system has been discussed which captures an image of a predetermined area using an imaging apparatus and analyzes the captured image, thereby counting people in the image. Such a system is expected to be utilized in congestion elimination at the time of an event and evacuation guidance at the time of disaster by detecting congestion in a public space and grasping the flow of people in congestion.

"Hiroo Ikeda, Ryoma Oami, Hiroyoshi Miyano, Accuracy Improvement of People Counting Based on Crowd-Patch Learning Using Convolutional Neural Network, FIT 2014" discusses a method for directly estimating the number of people appearing in a predetermined estimation area on an image, using a recognition model obtained by machine learning. Hereinafter, this method will be referred to as a "regression-based estimation method".

In the regression-based estimation method, to improve the accuracy of estimating the number of particular objects, it is necessary to set an estimation area of a size proportional to the size of a particular object appearing on an image. At this time, in a case where a plurality of estimation areas is set on an image captured by an imaging apparatus, a method may be used in which a user sets a plurality of estimation areas on the image while confirming the size of the particular object appearing on the image. At this time, the larger the number of samples of the size of the particular object appearing on the image is, the more appropriately an estimation area of a size proportional to the size of the particular object appearing on the image can be set. However, a sufficient number of particular objects do not necessarily appear on the image confirmed by the user. Thus, an estimation area of a size proportional to the size of the particular object appearing on the image may not be able to be appropriately set.

SUMMARY OF THE INVENTION

According to an aspect of the present disclosure, an image processing apparatus includes a detection unit configured to execute detection processing for detecting a particular object in an image captured by an imaging unit, a holding unit configured to hold object information indicating a position and a size, on the image, of the particular object detected in the detection processing, a determination unit configured to determine whether a number of times a particular object is detected in the detection processing on one or more images captured by the imaging unit reaches a predetermined value, a first setting unit configured to, in a case where the determination unit determines that the number of times a particular object is detected in the detection processing on the one or more images reaches the predetermined value, set a plurality of estimation areas on an image captured by the imaging unit, based on the object information obtained by the detection processing on the one or more images, and an estimation unit configured to execute estimation processing for estimating a number of the particular objects included in the plurality of estimation areas.

Further features of the present disclosure will become apparent from the following description of exemplary embodiments with reference to the attached drawings.

BRIEF DESCRIPTION OF THE DRAWINGS

FIG. 6A is a flowchart illustrating a flow of the processing for setting estimation areas, and FIG. 6B is a flowchart illustrating the estimation processing on the estimation areas.

FIG. 8 is a flowchart illustrating a flow of the processing for setting estimation areas.

DESCRIPTION OF THE EMBODIMENTS

Figure 1:
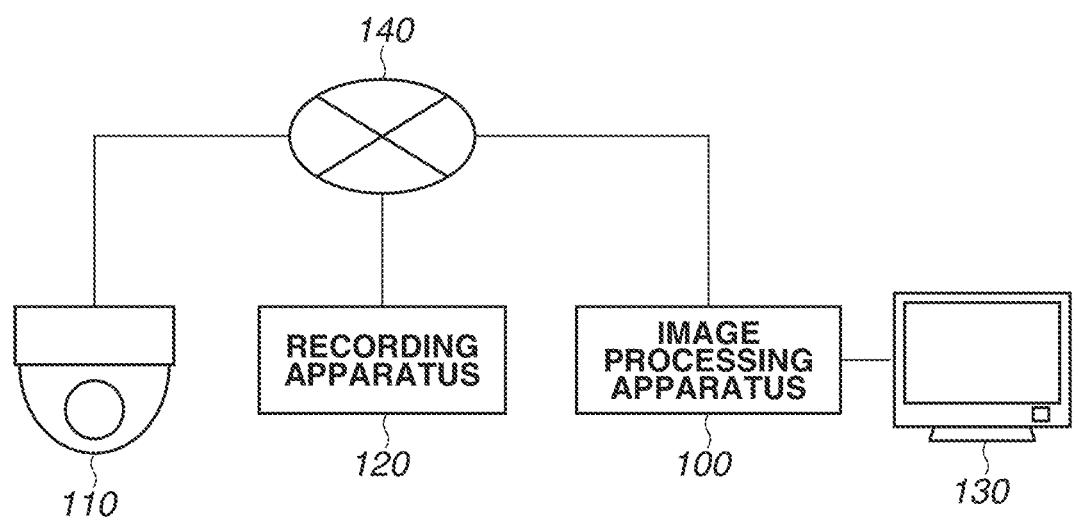
FIG. 1 is a diagram illustrating an example of a configuration of a system.

Exemplary embodiments of the present disclosure will be described below with reference to the attached drawings. The configurations described in the following exemplary embodiments are merely examples, and the present disclosure is not limited to the configurations illustrated in the drawings.

FIG. 1 is a diagram illustrating a configuration of a system according to a first exemplary embodiment. The system according to the present exemplary embodiment includes an image processing apparatus 100, an imaging apparatus 110, a recording apparatus 120, and a display 130.

The image processing apparatus 100, the imaging apparatus 110, and the recording apparatus 120 are connected to each other via a network 140. The network 140 is implemented by a plurality of routers, switches, and cables compliant with a communication standard such as Ethernet (registered trademark).

The network 140 may be implemented by the Internet, a wired local area network (LAN), a wireless LAN, or a wide area network (WAN).

The image processing apparatus 100 is implemented by, for example, a personal computer on which a program for implementing the image processing function to be described below is installed. The imaging apparatus 110 captures an image. The imaging apparatus 110 then transmits image data of the captured image, information regarding the image capturing time when the image is captured, and identification information for identifying the imaging apparatus 110, in association with each other to an external apparatus such as the image processing apparatus 100 or the recording apparatus 120 via the network 140. The system according to the present exemplary embodiment includes one imaging apparatus 110, but may include a plurality of the imaging apparatuses 110.

The recording apparatus 120 records the image data of the image captured by the imaging apparatus 110, the information regarding the image capturing time when the image is captured, and the identification information for identifying the imaging apparatus 110, in association with each other. Then, in response to a request from the image processing apparatus 100, the recording apparatus 120 transmits the recorded data (e.g., image, identification information) to the image processing apparatus 100.

The display 130 includes a liquid crystal display (LCD) and the like, and displays the result of the image processing by the image processing apparatus 100, the image captured by the imaging apparatus 110, or the like. The display 130 is connected to the image processing apparatus 100 via a display cable compliant with a communication standard such as High-Definition Multimedia Interface (HDMI).

The display 130 functions as a display unit and displays the image captured by the imaging apparatus 110, the result of the image processing to be described below, or the like. At least two or all of the display 130, the image processing apparatus 100, and the recording apparatus 120 may be provided in a single housing. The image processing apparatus 100 and the imaging apparatus 110 may be provided in a single housing. In other words, the imaging apparatus 110 may have the function and the configuration of the image processing apparatus 100 to be described below.

The result of the image processing by the image processing apparatus 100 and the image captured by the imaging apparatus 110 are displayed on not only the display 130 connected to the image processing apparatus 100 via the display cable, but also a display included in an external apparatus, for example, a mobile device such as a smartphone or a tablet terminal connected to the image processing apparatus 100 via the network 140.

Figure 2:
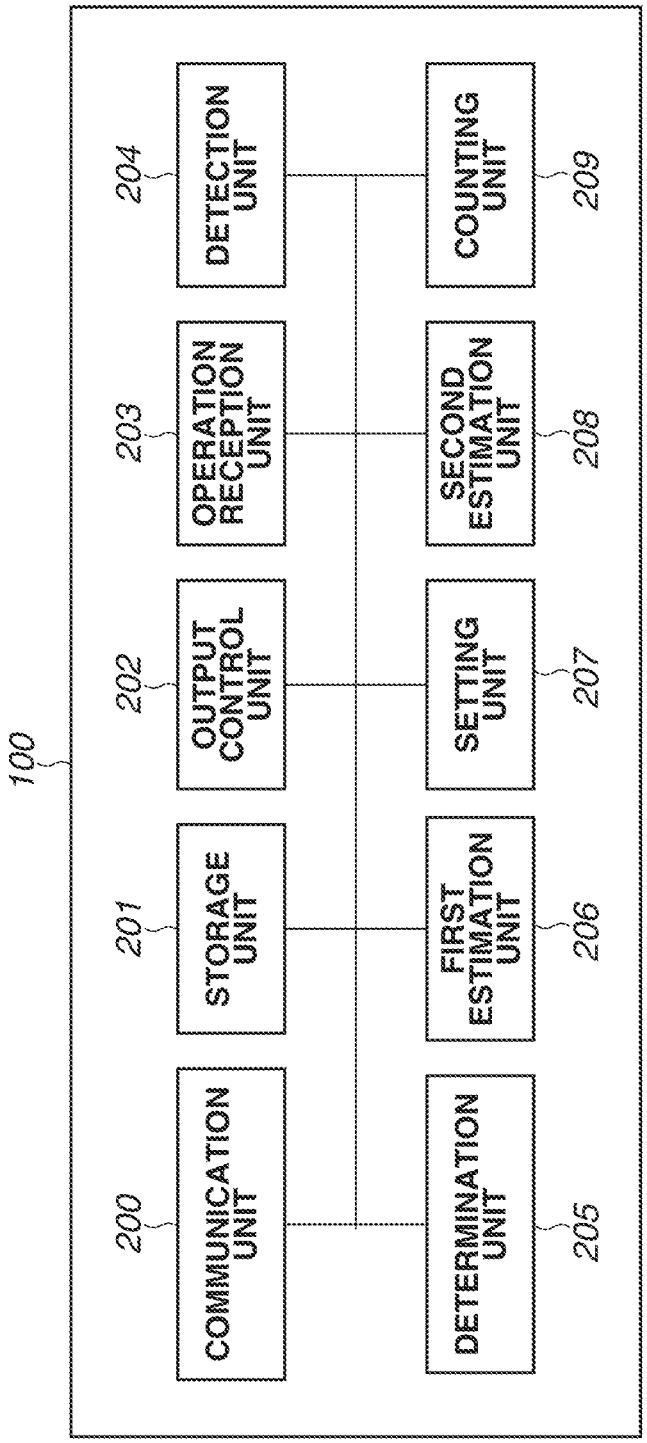
FIG. 2 is a diagram illustrating functional blocks of an image processing apparatus.

Next, with reference to the functional blocks of the image processing apparatus 100 according to the present exemplary embodiment illustrated in FIG. 2, the image processing by the image processing apparatus 100 according to the present exemplary embodiment will be described. In the present exemplary embodiment, the functions illustrated in FIG. 2 are implemented as follows, using a read-only memory (ROM) 902 and a central processing unit (CPU) 900 to be described below with reference to FIG. 9. The functions illustrated in FIG. 2 are implemented by the CPU 900 of the image processing apparatus 10 executing a computer program stored in the ROM 902 of the image processing apparatus 100.

Figure 9:
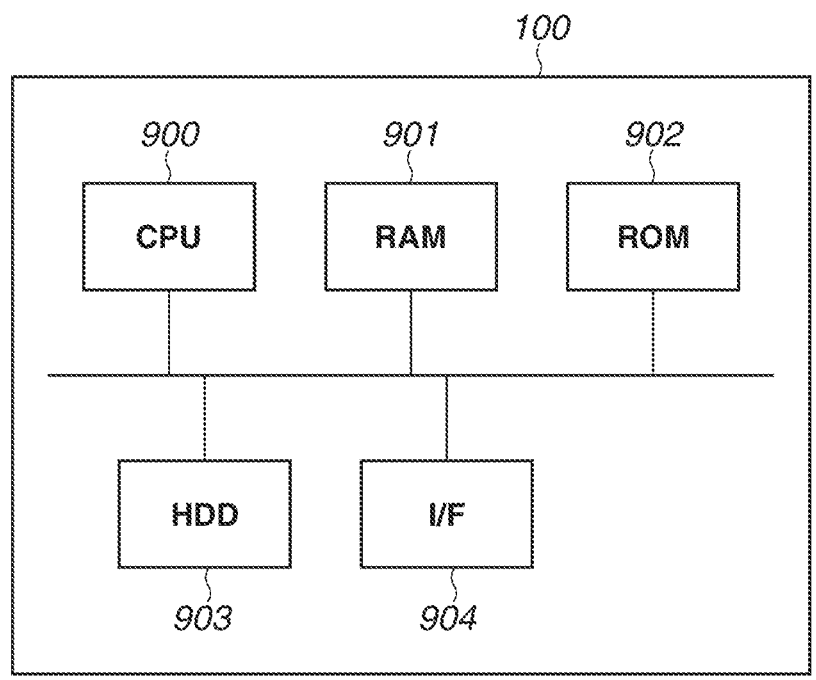
FIG. 9 is a diagram illustrating a hardware configuration of each apparatus.

A communication unit 200 can be implemented by an interface (I/F) 904 to be described below with reference to FIG. 9, and communicates with the imaging apparatus 110 and the recording apparatus 120 via the network 140. For example, the communication unit 200 receives image data of the image captured by the imaging apparatus 110 or transmits a control command for controlling the imaging apparatus 110 to the imaging apparatus 110. The control command includes, for example, a command to instruct the imaging apparatus 110 to capture an image.

A storage unit 201 can be implemented by a random-access memory (RAM) 901 or a hard disk drive (HDD) 903 to be described below with reference to FIG. 9, and stores information and data related to the image processing by the image processing apparatus 100. The storage unit 201 holds object information indicating information regarding the position and the size of a particular object on the image, which is detected in detection processing by a detection unit 204 to be described below.

An output control unit 202 outputs the image captured by the imaging apparatus 110, information indicating the result of the image processing, or the like to an external apparatus, or displays the image, the information, or the like on the display 130. Examples of the external apparatus to which the output control unit 202 outputs such information include another image processing apparatus (not illustrated) and the recording apparatus 120. An operation reception unit 203 receives, through an input device (not illustrated) such as a keyboard or a mouse, an operation performed by a user.

The detection unit 204 executes the detection processing for detecting a particular object in the image, using a method different from a regression-based estimation method. The detection unit 204 according to the present exemplary embodiment performs processing such as pattern matching using a collation pattern (dictionary), for example, thereby detecting the particular object from the image. Then, every time the particular object is detected in the image, the storage unit 201 accumulates object information indicating the position and the size of the particular object on the image.

In a case where a person is detected as the particular object from the image, a person may be detected from the image using a plurality of collation patterns such as a collation pattern for a person facing the front and a collation pattern for a person facing sideways. In this way, by executing the detection processing using a plurality of collation patterns, it is possible to expect an improvement in detection accuracy.

As a collation pattern, a collation pattern indicating a particular object viewed from another angle such as an oblique direction or an upward direction may be prepared. In a case where a person is detected as the particular object, a collation pattern (dictionary) indicating the features of the entire body does not necessarily need to be prepared, and a collation pattern may be prepared regarding a part of the body, such as the upper body, the lower body, the head, the face, or the feet.

A determination unit 205 determines whether the number of times the particular object is detected in the detection processing on a plurality of images reaches a predetermined value. In other words, the determination unit 205 determines whether the number of pieces of object information held and accumulated in the storage unit 201 reaches the predetermined value.

Based on the object information regarding the particular object detected in the detection processing by the detection unit 204 on the plurality of images captured by the imaging apparatus 110, a first estimation unit 206 estimates the size of the particular object at each position on an image captured by the imaging apparatus 110. In the following description, information indicating the size of the particular object at each position on an image estimated by the first estimation unit 206 is defined as geometry information.

If the determination unit 205 determines that the number of times the particular object is detected reaches the predetermined value, a setting unit 207 sets a plurality of estimation areas based on the object information regarding the particular object detected in the detection processing. More specifically, if the number of times the particular object is detected in the detection processing on the plurality of images reaches the predetermined value, the setting unit 207 sets a plurality of estimation areas on an image according to the geometry information that is estimated by the first estimation unit 206 based on the object information accumulated in the storage unit 201.

Using the regression-based estimation method, a second estimation unit 208 executes estimation processing for estimating the number of particular objects included in each of the plurality of estimation areas on the image set by the setting unit 207. In the regression-based estimation method, using a regressor (trained recognition model) to which a small image of a certain fixed size S is input and from which the number of particular objects appearing on the small image is output, the number of particular objects in the estimation areas on the image captured by the imaging apparatus 110 is estimated. The regressor is trained in advance in such a way that many small images of the fixed size S in which the position of the particular object is known are prepared and the regressor is trained using these small images as training data based on a machine learning technique. In the training, to improve the accuracy of estimating the number of particular objects, it is desirable that the ratio between the size (fixed size S) of each small image as the training data and the size of the particular object appearing on the small image should be approximately constant. For each of the plurality of estimation areas, the second estimation unit 208 generates a small image by resizing an image of the estimation area to the fixed size S and inputs the generated small image to the regressor, thereby obtaining "the position of the particular object in the estimation area" as an output from the regressor. At this time, the number of positions of the particular object in the estimation area is the number of particular objects in the estimation area.

When the setting unit 207 sets a plurality of estimation areas on an image, it is desirable that the ratio between the size of each estimation area and the size of the particular object in the estimation area should be approximately the same as a ratio r between the size of each small image as the training data and the size of the particular object appearing on the small image. In this way, by setting estimation areas on an image so as to come close to the environment of the training data, it is possible to further enhance the accuracy of estimating the number of particular objects included in the estimation areas.

Thus, if the determination unit 205 determines that the number of times the particular object is detected in the detection processing on the plurality of images reaches the predetermined value, the setting unit 207 according to the present exemplary embodiment executes processing as follows. The setting unit 207 sets a plurality of estimation areas on the image so that the ratio between the size of each estimation area and the size of the particular object included in the estimation area is the ratio r corresponding to the training data, according to the geometry information that is estimated based on the object information accumulated in the storage unit 201.

A counting unit 209 acquires a counting result by totaling the numbers of particular objects estimated in the estimation processing performed by the second estimation unit 208 on the respective plurality of estimation areas set on a captured image. The output control unit 202 outputs information indicating the counting result obtained by totaling the numbers of particular objects estimated in the respective estimation areas, to an external apparatus (e.g., the display 130).

Figure 3:
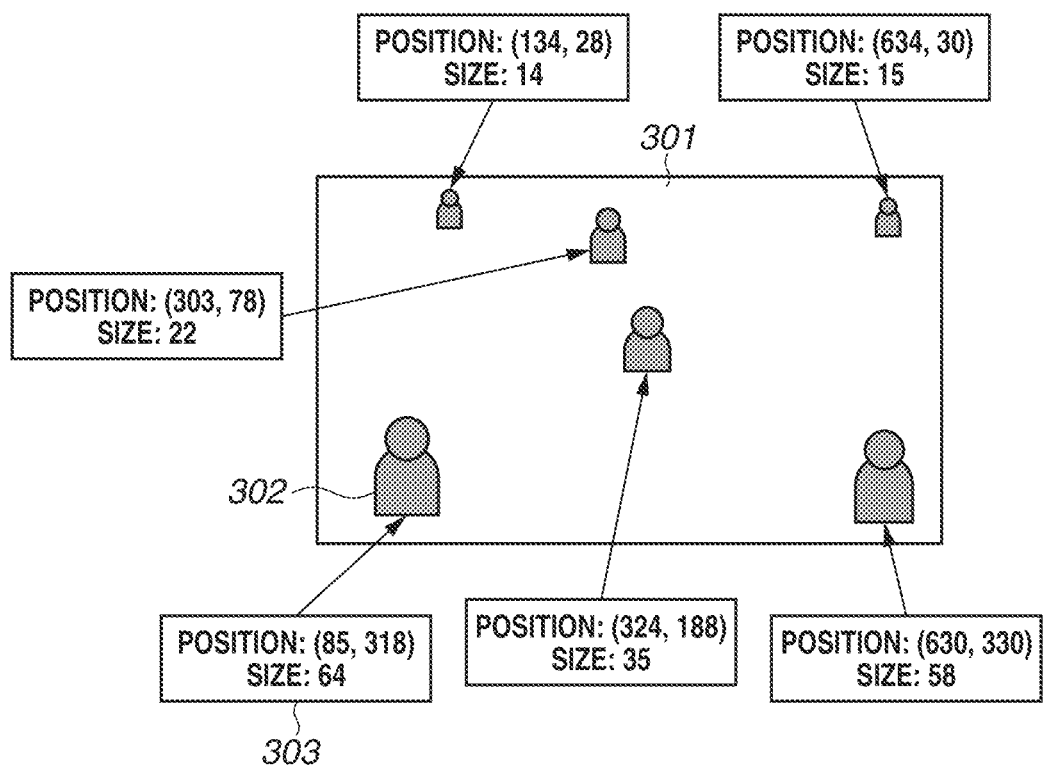
FIG. 3 is a diagram illustrating processing for setting estimation areas.

Next, with reference to FIG. 3, the image processing according to the present exemplary embodiment will be more specifically described. Although the following description is given on the assumption that particular objects whose number is estimated are people, the particular objects are not limited to people. For example, the particular objects may be various vehicles running on a road, components or products flowing on a conveyer in a factory, or animals.

FIG. 3 is a diagram illustrating a state where persons 302 are detected from an image 301 by the detection unit 204. The image 301 is captured by the imaging apparatus 110, and the plurality of persons 302 appears on the image 301. The detection unit 204 according to the present exemplary embodiment detects an area of each person 302 (hereinafter, a "person area") on the image 301 by using a pattern matching method with a collation pattern. Object information 303 illustrated in FIG. 3 indicates the position and the size, on the image 301, of the person area detected from the image 301 by the detection unit 204. The position, on the image 301, of the detected person area in the object information 303 is represented by an X-coordinate and a Y-coordinate at the center position of the detected person area relative to the upper left end point of the image 301 defined as the origin. The size, on the image 301, of the detected person area in the object information 303 indicates the length of the detected person area in the vertical direction (Y-axis direction) of the image 301. The storage unit 201 holds and accumulates pieces of the object information 303 that correspond to the respective plurality of persons 302 detected from the image 301 as illustrated in FIG. 3. Although the example illustrated in FIG. 3 illustrates the state where the persons 302 are detected from one frame image 301, the detection unit 204 executes the detection processing for detecting persons over a plurality of frame images captured by the imaging apparatus 110. Every time a person is detected in the plurality of frame images, the storage unit 201 holds and accumulates object information regarding the detected person.

If the determination unit 205 determines that the number of times a person is detected in the plurality of images reaches the predetermined value, the first estimation unit 206 estimates geometry information indicating the size of a person appearing at an arbitrary position on an image, based on the object information regarding the detected persons accumulated in the storage unit 201. The geometry information is given as a size $f(x,y)$ of an average person appearing at an arbitrary position $(x,y)$ on an image. It is assumed that the size $f(x,y)$ of a person at an arbitrary position on an image can be represented by, for example, x, y, and one or more parameters. For example, it is assumed that $f(x,y)=ax+by+c$. In this example, unknown parameters are a, b, and c. The first estimation unit 206 can obtain the unknown parameters using statistical processing such as the method of least squares, based on the object information regarding the detected persons accumulated in the storage unit 201. The first estimation unit 206 estimates the parameters of $f(x,y)$ using an existing optimization technique such as the method of least squares or Newton's method.

Figure 4A:
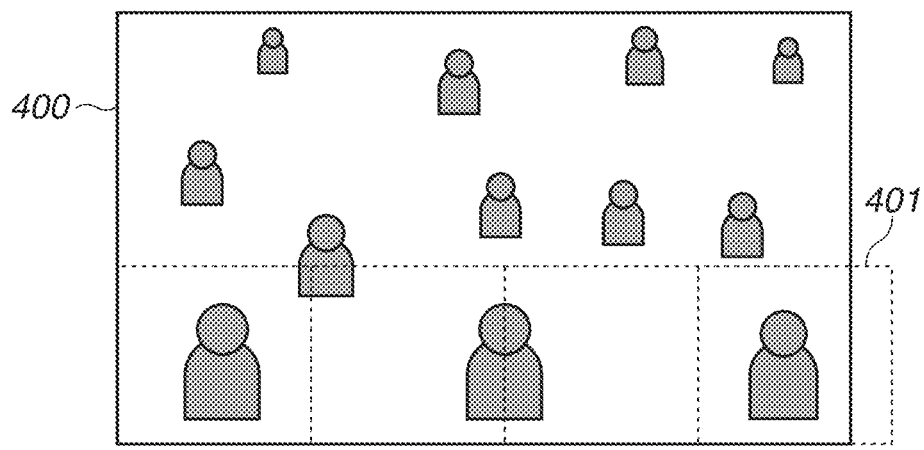
FIGS. 4A to 4C are diagrams illustrating the processing for setting estimation areas.
Figure 4B:
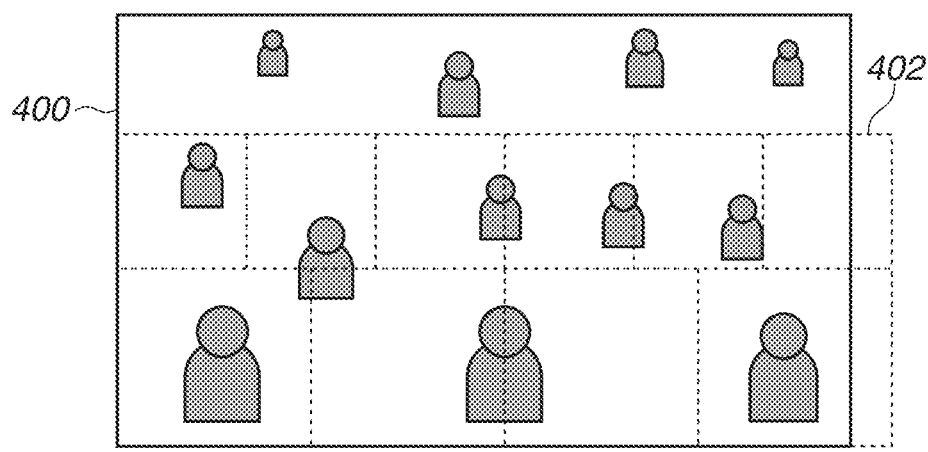
Figure 4C:
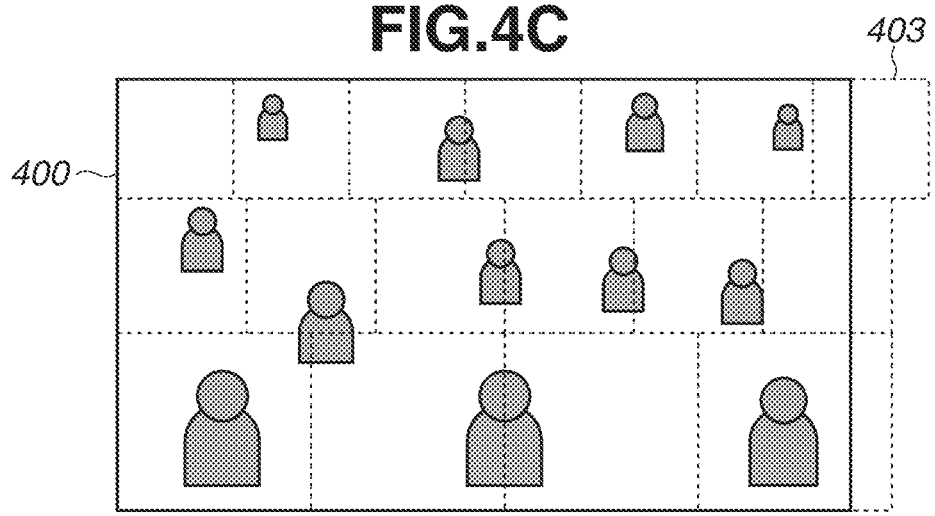

Next, with reference to FIGS. 4A to 4C, a description will be given of the processing for setting a plurality of estimation areas performed by the setting unit 207 according to the present exemplary embodiment. FIGS. 4A to 4C are diagrams each illustrating a state where the setting unit 207 sets a plurality of estimation areas on an image 400 captured by the imaging apparatus 110. In the examples illustrated in FIGS. 4A to 4C, as the size of a person at an arbitrary position on an image indicated by the geometry information, the sizes of the persons are approximately the same as each other in the horizontal direction of the image 40, and the sizes of the persons become smaller from the lower portion to the upper portion in the vertical direction of the image 400. First, as illustrated in FIG. 4A, the setting unit 207 according to the present exemplary embodiment sets a plurality of estimation areas 401 along the lower end of the image 400. At this time, the setting unit 207 sets each estimation area 401 so that the ratio between the size of the estimation area 401 and the size of the person at the coordinates of the lower end in the estimation area 401 indicated by the geometry information is approximately the same as the ratio r corresponding to the training data. Next, as illustrated in FIG. 4B, the setting unit 207 sets a plurality of estimation areas 402 along the upper end of the plurality of estimation areas 401. At this time, the setting unit 207 sets each estimation area 402 so that the ratio between the size of the estimation area 402 and the size of the person at the coordinates of the lower end in the estimation area 402 indicated by the geometry information is approximately the same as the ratio r corresponding to the training data. Next, as illustrated in FIG. 4C, the setting unit 207 sets a plurality of estimation areas 403 along the upper end of the plurality of estimation areas 402. At this time, the setting unit 207 sets each estimation area 403 so that the ratio between the size of the estimation area 403 and the size of the person at the coordinates of the lower end in the estimation area 403 indicated by the geometry information is approximately the same as the ratio r corresponding to the training data. As described above, the setting unit 207 according to the present exemplary embodiment sets estimation areas on an image so that the ratio between the size of each estimation area and the size of the particular object in the estimation area is approximately the same as the ratio r between the size of each small image as the training data and the size of the particular object appearing on the small image. By setting estimation areas on an image so as to come close to the environment of the training data, it is possible to further enhance the accuracy of estimating the number of particular objects included in the estimation areas. In the above description given with reference to FIGS. 4A to 4C, the estimation areas 401, 402, and 403 are set in order from the lower end of the image 400. The setting method, however, is not limited thereto. Alternatively, estimation areas may be set from another position.

Figure 5:
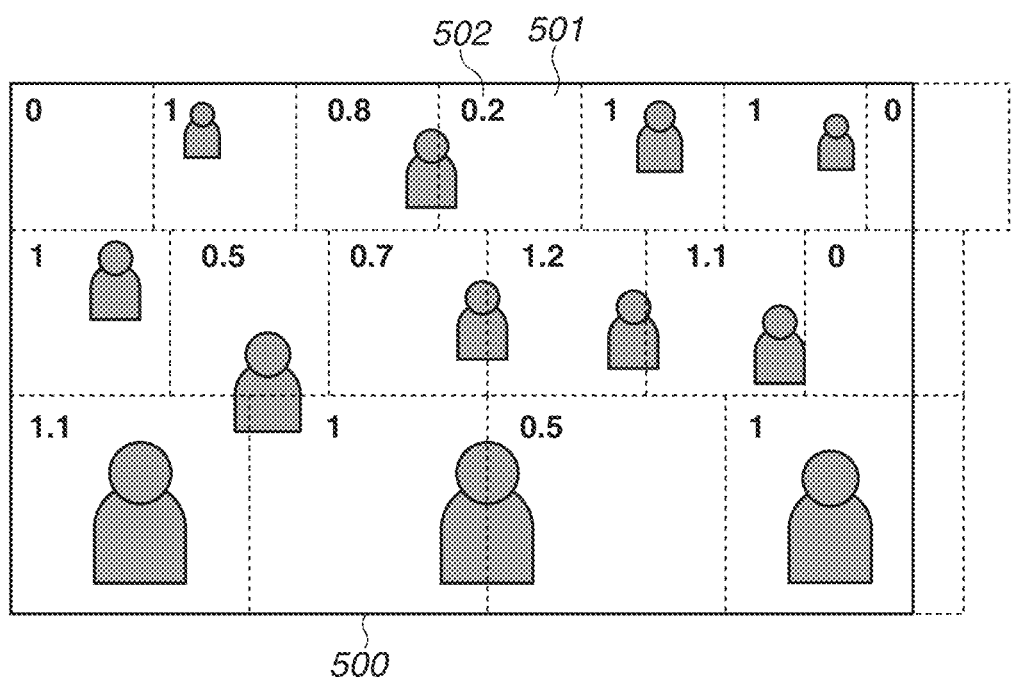
FIG. 5 is a diagram illustrating estimation processing on the estimation areas.

For each of a plurality of estimation areas set on an image 500 (refer to FIG. 5), the second estimation unit 208 generates a small image by resizing an image of the estimation area to the fixed size S and inputs the small image to the regressor trained in advance, thereby obtaining "the position of the person in the estimation area" as an output from the regressor. At this time, the number of positions of persons in the estimation area indicates the number of persons included in the estimation area. The number of positions of persons in the estimation area may be an integer or a real value including a numerical value after the decimal point. FIG. 5 is a schematic diagram illustrating the result of the estimation processing performed by the second estimation unit 208 on each of the plurality of small areas set on the image 500 by the setting unit 207. As illustrated in FIG. 5, a numerical value 502 included in an estimation area 501 indicates the number of persons estimated in the estimation area 501. The counting unit 209 acquires a counting result, namely 12.1 persons, obtained by totaling the numbers of persons estimated in the estimation processing performed by the second estimation unit 208 on the respective plurality of estimation areas 501 set on the captured image 500. The output control unit 202 superimposes on the image 500 the plurality of estimation areas 501 and the numerical values 502 indicating the result of the estimation processing performed on the plurality of estimation areas 501, thereby generating an output image. Then, the output control unit 202 outputs the generated output image to an external apparatus (the display 130). At this time, the output control unit 202 may display the generated output image on the display 130.

Next, with reference to FIGS. 6A and 6B, the image processing according to the present exemplary embodiment will be described in further detail. By executing processing in a flowchart illustrated in FIG. 6A, it is possible to set a plurality of estimation areas on an image. By executing processing in a flowchart illustrated in FIG. 6B, it is possible to execute estimation processing on the plurality of estimation areas set on the image, thereby estimating the number of persons included in the image. The processing in the flowchart illustrated in FIG. 6A is started or ended, for example, according to an instruction from the user. The processing in the flowchart illustrated in FIG. 6B is executed after the processing in the flowchart illustrated in FIG. 6A is executed to set a plurality of estimation areas. The processing in the flowcharts illustrated in FIGS. 6A and 6B is executed by the functional blocks illustrated in FIG. 2 that are implemented by the CPU 900 of the image processing apparatus 100 executing a computer program stored in the ROM 902 of the image processing apparatus 100.

First, the processing in the flowchart illustrated in FIG. 6A will be described. In step S601, the communication unit 200 acquires, as a processing target image, one frame image of a moving image captured by the imaging apparatus 110. The communication unit 200 may acquire the processing target image from the imaging apparatus 110 or the recording apparatus 120 via the network 140, or may acquire the processing target image from the storage unit 201 of the image processing apparatus 100.

Next, in step S602, the detection unit 204 executes the detection processing for detecting a person in the image. The detection unit 204 according to the present exemplary embodiment performs processing such as pattern matching using a collation pattern (dictionary), thereby detecting a person.

Next, in step S603, every time a person is detected in the image, the storage unit 201 accumulates object information indicating the position and the size of the person on the image.

Next, in step S604, the determination unit 205 determines whether the number of times a person is detected in the detection processing reaches a predetermined value. In other words, the determination unit 205 determines whether the number of pieces of object information held and accumulated in the storage unit 201 reaches the predetermined value. If the determination unit 205 determines that the number of times a person is detected in the detection processing does not reach the predetermined value (NO in step S604), the processing returns to step S601, and the communication unit 200 acquires, as the processing target image, the next frame image of the moving image captured by the imaging apparatus 110. As described above, the processing in steps S601 to S603 is repeated until the number of times a person is detected in the detection processing reaches the predetermined value. Every time a person is detected, the storage unit 201 accumulates object information regarding the detected person.

If the determination unit 205 determines in step S604 that the number of times a person is detected in the detection processing reaches the predetermined value (YES in step S604), the processing proceeds to step S605. In step S605, based on the object information regarding the detected persons accumulated in the storage unit 201, the first estimation unit 206 estimates geometry information indicating the size of a person appearing at an arbitrary position on an image.

Next, in step S606, based on the geometry information, the setting unit 207 sets a plurality of estimation areas on an image captured by the imaging apparatus 110 so that the ratio between the size of each estimation area and the size of the person in the estimation area is approximately the same as the ratio r corresponding to the training data.

Next, the processing in the flowchart illustrated in FIG. 6B will be described. First, in step S661, the communication unit 200 acquires, as a processing target image, one frame image of a moving image captured by the imaging apparatus 110. The communication unit 200 may acquire the processing target image from the imaging apparatus 110 or the recording apparatus 120 via the network 140, or may acquire the processing target image from the storage unit 201 of the image processing apparatus 100. The communication unit 200 may acquire, as the processing target image, a still image captured by the imaging apparatus 110.

Next, in step S662, the setting unit 207 acquires information regarding the plurality of estimation areas set in step S606, and sets the plurality of estimation areas on the current processing target image. Next, in step S663, the second estimation unit 208 executes the estimation processing for estimating the number of persons on each of the plurality of estimation areas set on the current processing target image.

Next, in step S664, the counting unit 209 acquires a counting result by totaling the numbers of persons estimated in the estimation processing performed by the second estimation unit 208 on the respective plurality of estimation areas set on the captured image. Next, in step S665, the output control unit 202 outputs information indicating the counting result obtained by totaling the numbers of persons estimated in the respective estimation areas, to an external apparatus (e.g., the display 130). Next, if an end instruction is not given by the user in step S666 (NO in step S666), the processing returns to step S661. In step S661, the communication unit 200 acquires, as the processing target image, the next frame image of the moving image captured by the imaging apparatus 110. If the end instruction is given by the user (YES in step S666), the processing illustrated in FIG. 6B ends.

In FIG. 6A, it is determined whether the number of times a person is detected reaches the predetermined value in step S604. If the number of times a person is detected reaches the predetermined value, geometry information is estimated in step S605 and then a plurality of estimation areas is set in step S606. The processing, however, is not limited thereto. Alternatively, for example, a first threshold and a second threshold greater than the first threshold may be set in advance. If the number of times a person is detected reaches the first threshold in step S604, geometry information may be estimated in step S605 and then a plurality of estimation areas may be set in step S606. Setting information regarding the plurality of estimation areas set at this time may be defined as first setting information. Then, while the processing in the flowchart illustrated in FIG. 6B is executed based on the first setting information, the processing in the flowchart illustrated in FIG. 6A may be executed in parallel. In this case, in the processing in FIG. 6A executed in parallel with the processing in FIG. 6B executed based on the first setting information, it may be determined whether the number of times a person is detected reaches the second threshold in step S604. Then, if the number of times a person is detected reaches the second threshold, geometry information may be estimated in step S605 and then a plurality of estimation areas may be set in step S606. Setting information regarding the plurality of estimation areas set at this time may be defined as second setting information. If the second setting information is acquired, the setting information used in the processing in the flowchart illustrated in FIG. 6B may be changed from the first setting information to the second setting information. As described above, the processing in FIG. 6A and the processing in FIG. 6B may be executed in parallel.

Even if the number of times a person is detected does not reach the predetermined value in step S604, when a certain time has elapsed since start of the processing in FIG. 6A, the processing may proceed to step S605.

The processing in the flowchart illustrated in FIG. 6A may be executed, for example, if the imaging direction (pan/tilt direction) or the zoom magnification of the imaging apparatus 110 is changed. If the imaging range (determined by the imaging direction and the zoom magnification), which is the range where the imaging apparatus 110 captures an image, is changed, the size of a person at an arbitrary position on an image, i.e., geometry information may change. Thus, the processing in the flowchart illustrated in FIG. 6A may be executed based on a change in the imaging range of the imaging apparatus 110.

As described above, in the present exemplary embodiment, if the number of times a particular object is detected over a plurality of images reaches a predetermined value, the image processing apparatus 100 estimates geometry information regarding the size of the particular object at an arbitrary position on an image, based on accumulated object information. Then, according to the geometry information, the image processing apparatus 100 sets a plurality of estimation areas on an image so that the ratio between the size of each estimation area and the size of the particular object included in the estimation area is the ratio r corresponding to training data. In this manner, it is possible to set estimation areas more appropriately. This can result in enhancing the accuracy of estimating the number of particular objects in the estimation areas.

Next, a second exemplary embodiment will be described. In the present exemplary embodiment, a particular object is detected in a plurality of areas (hereinafter referred to as divided areas) obtained by dividing an image. If the number of times the particular object is detected over a plurality of images reaches a predetermined value in each of the plurality of divided areas, geometry information is estimated, and a plurality of estimation areas is set according to the geometry information. The differences from the first exemplary embodiment will be mainly described, and components and processing same as or similar to those in the first exemplary embodiment are designated by the same reference numerals, and the redundant description thereof will not be omitted. Similarly to the first exemplary embodiment, although the following description is given on the assumption that the particular object is a person, the particular object is not limited to a person. For example, the particular object may be a vehicle running on a road, a component or product flowing on a conveyer in a factory, or an animal.

Figure 7A:
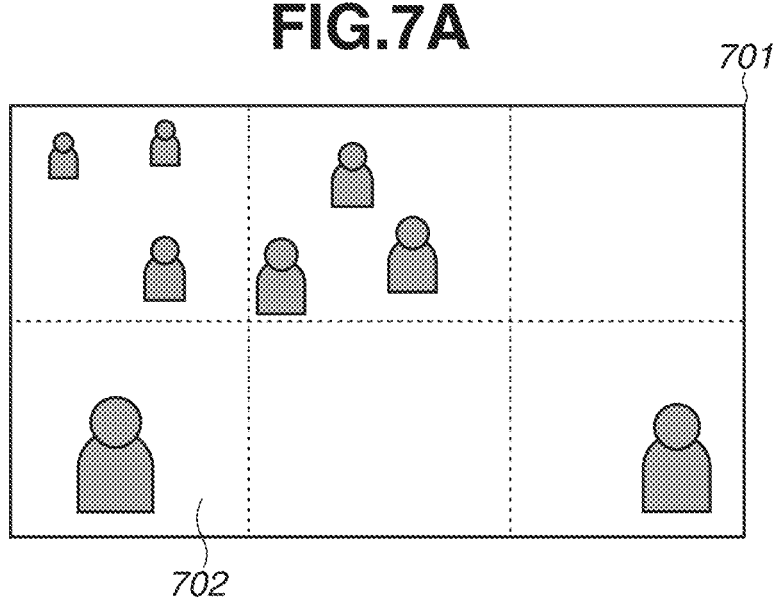
FIGS. 7A and 7B are diagrams illustrating processing for setting estimation areas.
Figure 7B:
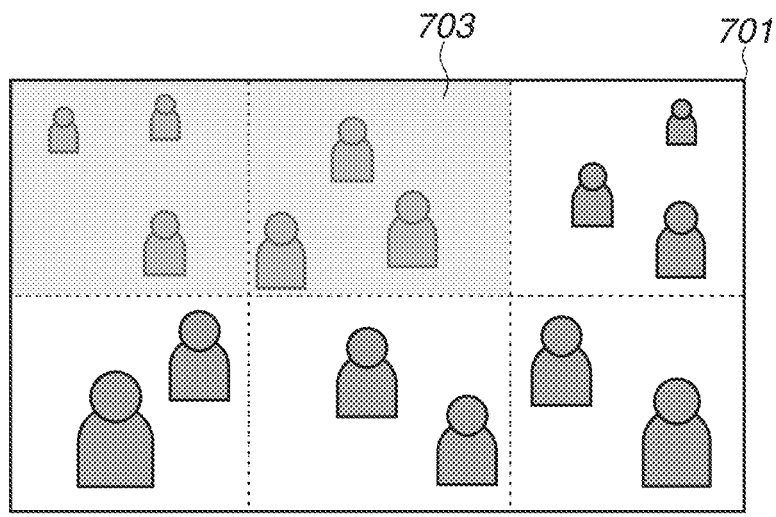

First, with reference to FIGS. 7A and 7B, processing by the image processing apparatus 100 according to the present exemplary embodiment will be described. As illustrated in FIG. 7A, the setting unit 207 according to the present exemplary embodiment sets a plurality of divided areas 702 into which an image 701 is divided. Then, the detection unit 204 executes detection processing for detecting a person in the plurality of divided areas 702 on the image 701.

Based on the result of the detection processing on a plurality of images, the determination unit 205 according to the present exemplary embodiment determines whether the number of times a person is detected reaches a predetermined value (threshold) in each of the plurality of divided areas 702. Then, the detection unit 204 stops executing the detection processing on a divided area where the determination unit 205 determines that the number of times a person is detected reaches the predetermined value (threshold), among the plurality of divided areas 702. Each of divided areas 703 illustrated in FIG. 7B represents a divided area where the determination unit 205 determines that the number of times a person is detected reaches the predetermined value (threshold). In this manner, the detection unit 204 according to the present exemplary embodiment continues the detection processing until it is determined that the number of times a person is detected reaches the predetermined value (threshold) in all the plurality of divided areas 702. The predetermined value (threshold) compared with the number of times a person is detected in each of the plurality of divided areas 702 is set in advance by the setting unit 207. At this time, the setting unit 207 sets the predetermined value (threshold), for example, according to an instruction from the user. The setting unit 207 may set a different predetermined value (threshold) for each divided area 702.

Similarly to the first exemplary embodiment, every time a person is detected in the detection processing, the storage unit 201 accumulates and holds object information indicating the position and the size of the person on the image 701. Then, in the present exemplary embodiment, if the determination unit 205 determines that the number of times a person is detected reaches the predetermined value in each of the plurality of divided areas 702, the first estimation unit 206 estimates geometry information based on the object information regarding the persons accumulated in the storage unit 201. Then, based on the geometry information estimated by the first estimation unit 206, the setting unit 207 sets a plurality of estimation areas on an image.

Next, with reference to a flowchart illustrated in FIG. 8, the image processing by the image processing apparatus 100 according to the present exemplary embodiment will be described. By executing the processing in the flowchart illustrated in FIG. 8, it is possible to set a plurality of estimation areas on an image more appropriately. The processing in the flowchart illustrated in FIG. 8 is executed by the functional blocks illustrated in FIG. 2 that are implemented by the CPU 900 of the image processing apparatus 100 executing a computer program stored in the ROM 902 of the image processing apparatus 100.

First, in step S801, the communication unit 200 acquires, as a processing target image, one frame image of a moving image captured by the imaging apparatus 110. The communication unit 200 may acquire the processing target image from the imaging apparatus 110 or the recording apparatus 120 via the network 140, or may acquire the processing target image from the storage unit 201 of the image processing apparatus 100.

Next, in step S802, the setting unit 207 sets a plurality of divided areas on the processing target image. At this time, for example, based on an operation received by the operation reception unit 203 to specify divided areas on the image, the setting unit 207 sets divided areas such as six divided areas 702 illustrated in FIGS. 7A and 7B on the image. In the examples illustrated in FIGS. 7A and 7B, two rows each including three divided areas 702 arranged in the horizontal direction of the image 701 exist in the vertical direction of the image 701. The setting method, however, is not limited thereto. Alternatively, for example, the setting unit 207 may set a plurality of divided areas in such a manner that the number of divided areas arranged in the horizontal direction of the image and the number of rows in the vertical direction including the divided areas arranged in the horizontal direction may be any numbers. In addition, the setting unit 207 may change the size of divided areas on a row-by-row basis. For example, the size of divided areas included in a row at the lower end of the image 701 may be larger than the size of divided areas included in a row at the upper end of the image.

Next, in step S803, the detection unit 204 executes detection processing for detecting a person in an incomplete divided area on the processing target image. An "incomplete divided area" refers to a divided area where the number of times a person is detected does not reach a predetermined value (threshold), among the plurality of divided areas set on the image. More specifically, in step S803, the detection unit 204 does not execute the detection processing on a divided area where the number of times a person is detected reaches the predetermined value, among the plurality of divided areas, and executes the detection processing on a divided area where the number of times a person is detected does not reach the predetermined value, among the plurality of divided areas.

Next, in step S804, every time a person is detected in the image, the storage unit 201 accumulates object information indicating the position and the size of the person on the image.

Next, in step S805, the determination unit 205 determines whether there is an incomplete divided area. More specifically, the determination unit 205 determines whether there is a divided area where the number of times a person is detected does not reach the predetermined value, among the plurality of divided areas. If the determination unit 205 determines that there is an incomplete divided area (YES in step S805), the processing returns to step S801. In step S801, the communication unit 200 acquires, as the processing target image, the next frame image of the moving image captured by the imaging apparatus 110. As described above, the processing in steps S801 to S804 is repeated until the number of times a person is detected reaches the predetermined value in all the divided areas. Every time a person is detected, the storage unit 201 accumulates object information regarding the person.

If the determination unit 205 determines in step S805 that there is no incomplete divided area (NO in step S805), the processing proceeds to step S605. Steps S605 and S606 are similar to the processing described with reference to FIG. 6A in the first exemplary embodiment, and thus the description thereof will not be omitted.

As described above, in the processing in the flowchart illustrated in FIG. 8, the detection processing is continued until the number of times a person is detected reaches the predetermined value in each of the plurality of divided areas into which an image is divided, and object information regarding the detected person is accumulated. Then, based on the accumulated object information, the image processing apparatus 100 estimates geometry information. Then, according to the estimated geometry information, the image processing apparatus 100 sets a plurality of estimation areas on an image. After executing the processing in the flowchart illustrated in FIG. 8, the image processing apparatus 100 executes the processing in the flowchart illustrated in FIG. 6B, thereby estimating the numbers of persons included in the image, using the plurality of estimation areas set through the processing in the flowchart illustrated in FIG. 8. The image processing apparatus 100 then outputs a counting result obtained by totaling the estimated numbers of persons.

In the present exemplary embodiment, if the number of times a person is detected reaches the predetermined value in all the plurality of divided areas, geometry information is estimated in step S605 and then a plurality of estimation areas is set in step S606. The processing, however, is not limited thereto. Alternatively, for example, the determination unit 205 may determine whether the number of times a person is detected over a plurality of images in the detection processing reaches the predetermined value in each of a predetermined number of divided areas among the plurality of divided areas. Then, if the determination unit 205 determines that the number of times a person is detected reaches the predetermined value in each of the predetermined number of divided areas, geometry information may be estimated in step S605 and then a plurality of estimation areas may be set in step S606.

The determination unit 205 groups the plurality of divided areas set on the image into groups of divided areas at the same position in the vertical direction (Y-axis direction) of the image, and determines whether the number of times a person is detected reaches the predetermined value in at least one divided area in each of the plurality of groups. For example, the determination unit 205 groups six divided areas 702 illustrated in FIG. 7A into a group of three divided areas in the upper row and a group of three divided areas in the lower row, thereby grouping divided areas at the same position in the vertical direction of the image. Then, the determination unit 205 determines whether the number of times a person is detected reaches the predetermined value in at least one divided area in each of the group in the upper row and the group in the lower row. If the determination unit 205 determines that the number of times a person is detected reaches the predetermined value in at least one divided area in each of the plurality of groups, geometry information is estimated based on accumulated object information in step S605. If the determination unit 205 determines that the number of times a person is detected does not reach the predetermined value in at least one divided area in each of the plurality of groups, the detection processing is repeated on an image to accumulate object information.

As described above, the image processing apparatus 100 according to the present exemplary embodiment sets a plurality of divided areas on an image. Then, based on the number of times a particular object is detected in each of the divided areas over a plurality of images, in other words, based on accumulated object information, the image processing apparatus 100 according to the present exemplary embodiment estimates geometry information indicating the size of the particular object at an arbitrary position on an image. Then, according to the geometry information, the image processing apparatus 100 sets a plurality of estimation areas on an image so that the ratio between the size of each estimation area and the size of the particular object included in the estimation area is the ratio r corresponding to training data. In this manner, it is possible to set estimation areas more appropriately. This can result in enhancing the accuracy of estimating the number of particular objects in the estimation areas.

Other exemplary embodiments will be described. With reference to FIG. 9, a description will be given of the hardware configuration of the image processing apparatus 100 for implementing the functions according to each of the exemplary embodiments. Although the hardware configuration of the image processing apparatus 100 is described below, the recording apparatus 120 and the imaging apparatus 110 are also implemented by similar hardware configurations.

The image processing apparatus 100 according to the present exemplary embodiment includes the CPU 900, the RAM 901, the ROM 902, the HDD 903, and the I/F 904.

The CPU 900 is a central processing unit that performs overall control of the image processing apparatus 100. The RAM 901 temporarily stores a computer program executed by the CPU 900. The RAM 901 provides a work area used to execute processing by the CPU 900. For example, the RAM 901 functions as a frame memory or functions as a buffer memory.

The ROM 902 stores a program for the CPU 900 to control the image processing apparatus 100. The HDD 903 is a storage device that records image data.

The I/F 904 communicates with an external apparatus according to the Transmission Control Protocol/Internet Protocol (TCP/IP) or the Hypertext Transfer Protocol (HTTP) via the network 140.

Although the example where the CPU 900 executes processing has been described in the above exemplary embodiments, at least a part of the processing of the CPU 900 may be performed by dedicated hardware. For example, the process of displaying a graphical user interface (GUI) or image data on the display 130 may be executed by a graphics processing unit (GPU). The process of reading a program code from the ROM 902 and loading the program code into the RAM 901 may be executed by direct memory access (DMA) that functions as a transfer apparatus.

The above exemplary embodiments of the present disclosure can also be implemented by the process of causing one or more processors to read and execute a program for implementing one or more functions according to the above exemplary embodiments. The program may be supplied to a system or an apparatus including the one or more processors via a network or a storage medium. The above exemplary embodiments of the present disclosure can also be implemented by a circuit (e.g., application-specific integrated circuit (ASIC)) for implementing one or more functions according to the above exemplary embodiments. The components of the image processing apparatus 100 may be implemented by the hardware illustrated in FIG. 9, or can also be implemented by software.

Another apparatus may have one or more functions of the image processing apparatus 100 according to each of the above exemplary embodiments. For example, the imaging apparatus 110 may have one or more functions of the image processing apparatus 100 according to each of the exemplary embodiments. The above exemplary embodiments may be carried out by combining the above exemplary embodiments, such as optionally combining the above exemplary embodiments.

While the present disclosure has been described together with exemplary embodiments, the above exemplary embodiments merely illustrate specific examples for carrying out the present disclosure, and the technical scope of the present disclosure should not be interpreted in a limited manner based on these exemplary embodiments. The present disclosure can be carried out in various manners without departing from the technical idea or the main feature of the present disclosure. For example, the combinations of the exemplary embodiments are also included in the disclosed content of the specification.

By using the above exemplary embodiments, it is possible to set estimation areas more appropriately, thereby enhancing the accuracy of estimating the number of particular objects.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-214784, filed Nov. 27, 2019, which is hereby incorporated by reference herein in its entirety.

What is claimed is:

1. An image processing apparatus comprising:
   a processor; and
   a memory storing executable instructions which, when executed by the processor, cause the image processing apparatus to perform operations including:
   executing detection processing for detecting a particular object in one or more images captured by an imaging unit;
   storing object information indicating a position and a size, on the one or more images, of the particular object detected in the detection processing;
   determining whether a number of times the particular object is detected in the detection processing on the one or more images reaches a predetermined value;
   setting, in a case that the number of times the particular object is detected in the detection processing on the one or more images reaches the predetermined value, a plurality of estimation areas on an image captured by the imaging unit, based on the stored object information obtained by the detection processing on the one or more images; and
   executing estimation processing for estimating a number of particular objects in the plurality of estimation areas.

2. The image processing apparatus according to claim 1, wherein every time the particular object is detected in the one or more images, the object information regarding the particular object is stored, and
   wherein in a case that the number of times the particular object is detected in the detection processing on the one or more images reaches the predetermined value, the plurality of estimation areas is set based on the stored object information.

3. The image processing apparatus according to claim 1, wherein executing the executable instructions causes the information processing apparatus to perform further operations including: setting a plurality of divided areas into which an image captured by the imaging unit is divided.

4. The image processing apparatus according to claim 3, wherein it is determined whether the number of times the particular object reaches the predetermined value in each of the plurality of divided areas, and
   wherein in a case that the number of times the particular object is detected over the one or more images in the detection processing reaches the predetermined value in each of the plurality of divided areas, the plurality of estimation areas are set based on the stored object information obtained by the detection processing on the one or more images.

5. The image processing apparatus according to claim 3, wherein it is determined whether the number of times the particular object is detected over the one or more images in the detection processing reaches the predetermined value in each of a predetermined number of divided areas among the plurality of divided areas, and
   wherein in a case that the number of times the particular object is detected over the one or more images in the detection processing reaches the predetermined value in each of the predetermined number of divided areas among the plurality of divided areas, the plurality of estimation areas are set based on the stored object information obtained by the detection processing on the one or more images.

6. The image processing apparatus according to claim 4, wherein the detection processing is not executed on a divided area where the number of times the particular object is detected reaches the predetermined value, among the plurality of divided areas.

7. The image processing apparatus according to claim 1, wherein the number of the particular object is estimated included in the estimation areas, using a trained model regarding the particular object.

8. The image processing apparatus according to claim 1, wherein the particular object is a person.

9. An image processing method comprising:
   executing detection processing for detecting a particular object in one or more images captured by an imaging unit;
   storing object information indicating a position and a size, on the one or more images, of the particular object detected in the detection processing;
   determining whether a number of times the particular object is detected in the detection processing on the one or more images reaches a predetermined value;
   setting, in a case that the number of times the particular object is detected in the detection processing on the one or more images reaches the predetermined value, a plurality of estimation areas on an image captured by the imaging unit, based on the stored object information obtained by the detection processing on the one or more images; and executing estimation processing for estimating a number of particular objects in the plurality of estimation areas.

10. The image processing method according to claim 9, wherein every time the particular object is detected in the one or more images, the object information regarding the particular object is stored, and wherein in a case that the number of times the particular object is detected in the detection processing on the one or more images reaches the predetermined value, the plurality of estimation areas is set based on the stored object information.

11. The image processing method according to claim 9, further comprising setting a plurality of divided areas into which an image captured by the imaging unit is divided.

12. The image processing method according to claim 11, wherein it is determined whether the number of times the particular object reaches the predetermined value in each of the plurality of divided areas, and wherein in a case that the number of times the particular object is detected over the one or more images in the detection processing reaches the predetermined value in each of the plurality of divided areas, the plurality of estimation areas are set based on the stored object information obtained by the detection processing on the one or more images.

13. The image processing method according to claim 11, wherein it is determined whether the number of times the particular object is detected over the one or more images in the detection processing reaches the predetermined value in each of a predetermined number of divided areas among the plurality of divided areas, and wherein in a case that the number of times the particular object is detected over the one or more images in the detection processing reaches the predetermined value in each of the predetermined number of divided areas among the plurality of divided areas, the plurality of estimation areas are set based on the stored object information obtained by the detection processing on the one or more images.

14. The image processing method according to claim 12, wherein the detection processing is not executed on a divided area where the number of times the particular object is detected reaches the predetermined value, among the plurality of divided areas.

15. The image processing method according to claim 9, wherein the number of the particular object is estimated included in the estimation areas is estimated using a trained model regarding the particular object.

16. The image processing method according to claim 9, wherein the particular object is a person.

17. A non-transitory computer readable medium storing a computer-executable program for causing a computer to perform an image processing method, the method comprising:

executing detection processing for detecting a particular object in one or more images captured by an imaging unit;

storing object information indicating a position and a size, on the one or more images, of the particular object detected in the detection processing;

determining whether a number of times the particular object is detected in the detection processing on the one or more images reaches a predetermined value;

in a case that the number of times the particular object is detected in the detection processing on the one or more images reaches the predetermined value, set a plurality of estimation areas on an image captured by the imaging unit, based on the stored object information obtained by the detection processing on the one or more images; and executing estimation processing for estimating a number of particular objects in the plurality of estimation areas.

* * * * *